US009249060B2

(12) United States Patent
Herold et al.

(10) Patent No.: US 9,249,060 B2
(45) Date of Patent: Feb. 2, 2016

(54) FLEXIBLE WATERTIGHT ROOF COATINGS

(75) Inventors: Hardy Herold, Burghausen (DE); Gary P. Fischer, Leawood, KS (US); Kenneth Kempinski, Macungie, PA (US); Anke Reinschmidt, Macungie, PA (US)

(73) Assignee: WACKER CHEMIE AG, Munich (DE)

( * ) Notice: Subject to any disclaimer, the term of this patent is extended or adjusted under 35 U.S.C. 154(b) by 281 days.

(21) Appl. No.: 13/021,423

(22) Filed: Feb. 4, 2011

(65) Prior Publication Data

US 2012/0077906 A1  Mar. 29, 2012

(30) Foreign Application Priority Data

Sep. 23, 2010 (DE) .......................... 10 2010 041 292

(51) Int. Cl.
C04B 24/26 (2006.01)
C09D 133/10 (2006.01)
C04B 41/63 (2006.01)
C04B 26/04 (2006.01)
C04B 28/04 (2006.01)
C04B 40/06 (2006.01)
C04B 41/48 (2006.01)
C09D 1/08 (2006.01)
C09D 5/02 (2006.01)

(52) U.S. Cl.
CPC ............. *C04B 41/63* (2013.01); *C04B 24/2623* (2013.01); *C04B 24/2641* (2013.01); *C04B 24/2688* (2013.01); *C04B 26/04* (2013.01); *C04B 28/04* (2013.01); *C04B 40/0608* (2013.01); *C04B 41/4869* (2013.01); *C09D 1/08* (2013.01); *C09D 5/024* (2013.01)

(58) Field of Classification Search
CPC ............ C04B 24/2623; C04B 24/2641; C04B 24/2688; C04B 26/04; C04B 40/0608; C04B 41/63; C04B 28/04; C04B 14/06; C04B 14/062; C04B 14/104; C04B 14/28; C04B 14/305; C04B 7/32; C04B 14/02; C04B 14/26
USPC .......... 427/186; 524/556, 560, 563, 567, 570, 524/571
See application file for complete search history.

(56) References Cited

U.S. PATENT DOCUMENTS

| 4,614,755 | A | * | 9/1986 | Rodgers | .............................. 524/5 |
| 4,746,365 | A |  | 5/1988 | Babcock et al. | |
| 4,859,723 | A | * | 8/1989 | Kyminas et al. | ................. 524/31 |
| 4,859,751 | A |  | 8/1989 | Schulze et al. | |
| 6,809,148 | B1 |  | 10/2004 | Koppers | |
| 2001/0034391 | A1 |  | 10/2001 | Eck | |
| 2002/0161071 | A1 | * | 10/2002 | Mills et al. | ......................... 524/2 |
| 2003/0088045 | A1 |  | 5/2003 | Haberle | |
| 2006/0054059 | A1 |  | 3/2006 | Dubey et al. | |
| 2009/0069495 | A1 |  | 3/2009 | Fichtner et al. | |
| 2009/0155472 | A1 |  | 6/2009 | Grasse | |
| 2011/0257304 | A1 |  | 10/2011 | Zeh et al. | |

FOREIGN PATENT DOCUMENTS

| CA | 1046361 | | 1/1979 | | |
| CA | 2721223 | | 11/2009 | | |
| CN | 1109902 | A | 10/1995 | | |
| CN | 100364916 | | 1/2008 | | |
| CN | 101348637 | A | 1/2009 | | |
| DE | 3302440 | C1 | 10/1983 | | |
| DE | 10 2008 043 988 | | 5/2010 | | |
| DE | 102008055064 | | 6/2010 | | |
| EP | 0 149 098 | | 7/1985 | | |
| EP | 1134255 | A2 | 9/2001 | | |
| EP | 1347002 | A2 | 9/2003 | | |
| EP | 2017313 | | 1/2009 | | |
| JP | 4-300231 | | 10/1992 | | |
| JP | 8-120192 | | 5/1996 | | |
| JP | 2001-64881 | | 3/2001 | | |
| JP | 2001064881 | A | * | 3/2001 | ............... D06N 5/00 |
| WO | 0160883 | A1 | 8/2001 | | |
| WO | 03055828 | A1 | 7/2003 | | |
| WO | 2007054148 | A1 | 5/2007 | | |
| WO | WO 2009/064369 | | 5/2009 | | |
| WO | WO 2009/132967 | | 11/2009 | | |
| WO | 2010057888 | | 5/2010 | | |
| WO | 2010142669 | A1 | 12/2010 | | |
| WO | 2011026757 | A1 | 3/2011 | | |

OTHER PUBLICATIONS

Flick, E. W., "Water Soluble Resins—an Industrial Guide," pp. 74-93 and 124-129, $2^{nd}$ Edition, Noyes Publications, Park Ridge, NJ 1991.
Fox, T. G., Bull. Am. Physics Soc., 1, 3, p. 123, 1956.
Polymer Handbook, $2^{nd}$ Edition, J. Wiley & Sons, New York, 1975.
Wacker: "European Coating Show 2009 (ECS)", Press release of Wacker Mar. 31, 2009, XP002660573, Found in the internet: URL: http://www.wacker.com/cms/de/press_media/press-releases/archive-2009/pressinformation-2009-detail_20875.jsp.
English patent abstract for CN 1109902 A, Oct. 11, 1995.

* cited by examiner

Primary Examiner — David W Wu
Assistant Examiner — Marie Reddick
(74) Attorney, Agent, or Firm — RatnerPrestia

(57) ABSTRACT

The invention provides for the use of coating compositions based on one or more mineral binders, one or more polymers, one or more fillers, and, if desired, one or more additives for producing roof coatings, the coating compositions comprising at least 50% by weight of polymers, based on the dry weight of the polymers and of the mineral binders.

9 Claims, No Drawings

FLEXIBLE WATERTIGHT ROOF COATINGS

CROSS REFERENCE TO RELATED APPLICATIONS

This application claims priority of German patent application number 10 2010 041 292.9, filed Sep. 23, 2010, the entirety of which application is incorporated herein by reference.

FIELD OF THE INVENTION

The invention relates to the use of coating compositions for producing roof coatings, to methods for producing roof coatings, and to the roof coatings thus obtainable, and also to polymer mixtures in the form of aqueous dispersions or water-redispersible powders comprising vinyl ester polymers and (meth)acrylic ester polymers.

BACKGROUND OF THE INVENTION

Roof coatings constitute an upper finish on roofs. Roof coatings protect the roofs and hence also the entire constructions from effects of weathering, more particularly from rain, dew, mist, snow or extreme temperatures. Roof coatings, therefore, are not walls and also not the roof structure, i.e., not the framework of roofs, but instead are an outer skin which is applied to the framework of roofs. Roof coatings are therefore applied on the outer surface of roofs, i.e., on the side of roofs that faces the environment, and not on the inside, i.e., the side facing the interior of buildings. Roof coatings, then, are an outer layer, and preferably the outermost layer, of a roof.

For roof coatings, as alternatives to roofing shingles or concrete, a range of alternatives have been proposed, such as, for example, roof coatings on a bituminous basis, such as roofing felt, or on a polymeric basis, such as EPDM (polymers based on ethylene, propylene, and diene monomers), epoxy (self-crosslinking polymers containing epoxy groups) or PU (polyurethane systems). These systems may be applied in the form of sheets, panels or in liquid form. Also commonplace are TPO films (thermoplastic polyolefin films) or polyacrylates in liquid form. Existing liquid systems, especially aqueous systems, usually require long drying times upon their application, until the desired roof coatings are obtained. This disadvantage comes to bear particularly under cool or damp conditions. Moreover, during the drying process, there is always the risk of mechanical damage to the coating. In the case of sheets or panels, there is a risk of mechanical damage in the course of transportation to the construction site, or during application on the construction site. Furthermore, the coating of a roof necessitates a large number of panels or sheeting webs, which must be bonded adhesively in order to produce an assembly. These bonding sites, however, are a source of damage as a consequence of deficient bonding or aging, and this may lead to leaks and, ultimately, to failure of the roof coating. Lastly, at application thicknesses in the region of 3 mm, the common aqueous systems exhibit little sag resistance, and this necessitates the use of reinforcing fabric or cladding.

SUMMARY OF THE INVENTION

Against this background, the object was to provide alternative roof coatings which, in terms of their production and watertightness or crack-bridging properties, are to be superior to the comparable roof coatings known to date. For example, the roof coatings are to be resistant to rainwater and, accordingly, are to prevent the penetration of water into the substrates provided with the roof coatings, and in this way are intended to preserve the substrates from water damage. Cracks in substrates may come about, for example, as a consequence of subsoil movements, earthquakes or aging processes. The roof coatings, then, are to bridge such cracks occurring in the substrates, and in this way prevent the penetration of water into the substrates. Overall, therefore, a durable and resistant coating or sealing of substrates is to be produced. Furthermore, the roof coatings are to adhere very effectively to a wide variety of different substrates. Moreover, the aqueous coating compositions are to be easy to apply and, in the course of the production of the roof coatings, are to cure rapidly and without a long drying time.

Surprisingly this object has been achieved through the use of coating compositions comprising mineral binders, polymers, fillers, and, if desired, additives for producing roof coatings, the coating compositions comprising at least 50% by weight of polymers, based on the dry weight of the polymers and of the mineral binders.

DETAILED DESCRIPTION OF THE INVENTION

Coating compositions based on mineral binders, fillers, polymers, and, if desired, additives are well established and are used in the construction segment for a multiplicity of other applications. For example, U.S. Pat. No. 4,746,365 recommends coating compositions of this kind for coating concrete. WO-A 2009/064369 recommends concrete repair measures for which cementitious systems are employed. For producing watertight coatings, JP-A 4-300231 advises the use of rapid-curing cementitious systems which comprise 1 to 100 parts by weight of polymers per 100 parts by weight of cement. Likewise, JP-A 8-120192 recommends the use of cementitious coating compositions with a high cement content relative to polymers for the production of watertight coatings, such as on flat roofs or verandahs. WO-A 2009/132967 describes the aftertreatment of concrete of defined residual moisture content with flexible sealing slurries. CN-C 100364916 concerns itself with water-resistant heat insulation coatings on walls, based on cementitious mortars admixed with small amounts of polymers. JP-A 2001-064881 teaches the use of fiber mats, coated with cementitious, polymer-modified compositions, as roof underlayment. US 2006/0054059 describes flexible coatings in the form of membranes which can be rolled up, based on hydraulically setting binders and polymers. CA 1046361 recommends mats comprising a layer based on cement and polymers for the surface coating of buildings. Roof coatings with crack-bridging qualities or permanent flexibility, however, are not described.

The invention provides firstly for the use of coating compositions based on one or more mineral binders, one or more polymers, one or more fillers, and, if desired, one or more additives, for producing roof coatings,
the coating compositions comprising at least 50% by weight of polymers, based on the dry weight of the polymers and of the mineral binders.

As polymers, use is made in general of addition polymers of one or more ethylenically unsaturated monomers. Preferred ethylenically unsaturated monomers are selected from the group consisting of vinyl esters, (meth)acrylic esters, vinylaromatics, olefins, 1,3-dienes, and vinyl halides, and, if desired, further monomers copolymerizable therewith.

Suitable vinyl esters are, for example, those of carboxylic acids having 1 to 15 C atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, an example being VeoVa9[R] or VeoVa10[R] (trade names of the company Resolution). Vinyl acetate is particularly preferred.

Suitable monomers from the group of acrylic esters or methacrylic esters are, for example, esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particularly preferred are methyl acrylate, methyl methacrylate, n-butyl acrylate, tert-butyl acrylate, and 2-ethylhexyl acrylate.

Preferred vinylaromatics are styrene, methylstyrene, and vinyltoluene. A preferred vinyl halide is vinyl chloride. The preferred olefins are ethylene, propylene, and the preferred dienes are 1,3-butadiene and isoprene.

If desired it is possible additionally for 0% to 10% by weight, based on the total weight of the monomer mixture, of auxiliary monomers to be copolymerized. It is preferred to use 0.1% to 5% by weight of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid, such as the diethyl and diisopropyl esters, and also maleic anhydride; ethylenically unsaturated sulfonic acids and their salts, preferably vinylsulfonic acid and 2-acrylamido-2-methyl-propanesulfonic acid. Further examples are precrosslinking comonomers such as polyethylenically unsaturated comonomers, examples being diallyl phthalate, divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylol methacrylamide, N-methylol allylcarbamate, alkyl ethers such as the isobutoxy ether or esters of N-methylolacrylamide, of N-methylolmethacrylamide, and of N-methylol allylcarbamate. Also suitable are epoxide-functional comonomers such as glycidyl methacrylate and glycidyl acrylate. Further examples are silicon-functional comonomers, such as acryloyloxypropyltri(alkoxy)silanes and methacryloyloxypropyltri(alkoxy)-silanes, vinyltrialkoxysilanes and vinylmethyldialkoxysilanes, in which alkoxy groups present may be, for example, ethoxy and ethoxypropylene glycol ether radicals. Mention may also be made of monomers having hydroxyl or CO groups, examples being methacrylic and acrylic hydroxyalkyl esters such as hydroxyethyl, hydroxypropyl or hydroxybutyl acrylate or methacrylate, and also compounds such as diacetone-acrylamide and acetylacetoxyethyl acrylate or methacrylate.

Preference is given to one or more polymers selected from the group consisting of vinyl ester homopolymers, vinyl ester copolymers containing one or more monomer units from the group consisting of vinyl esters, olefins, vinylaromatics, vinyl halides, acrylic esters, methacrylic esters, fumaric and/or maleic monoesters or diesters; (meth)acrylic ester homopolymers, (meth)acrylic ester copolymers containing one or more monomer units from the group consisting of methacrylic esters, acrylic esters, olefins, vinylaromatics, vinyl halides, fumaric and/or maleic monoesters or diesters; homopolymers or copolymers of dienes such as butadiene or isoprene, and also of olefins such as ethene or propene, where the dienes may be copolymerized, for example, with styrene, with (meth)acrylic esters or with the esters of fumaric or maleic acid; homopolymers or copolymers of vinylaromatics, such as styrene, methylstyrene, vinyltoluene; homopolymers or copolymers of vinylhalogen compounds such as vinyl chloride, where the polymers may further contain auxiliary monomers.

Particularly preferred are copolymers of one or more vinyl esters with 1% to 50% by weight of ethylene; copolymers of vinyl acetate with 1% to 50% by weight of ethylene and 1% to 50% by weight of one or more further comonomers from the group consisting of vinyl esters having 1 to 12 C atoms in the carboxylic acid radical such as vinyl propionate, vinyl laurate, vinyl esters of alpha-branched carboxylic acids having 9 to 13 C atoms such as VeoVa9, VeoVa10, VeoVa11; copolymers of one or more vinyl esters, 1% to 50% by weight of ethylene, and preferably 1% to 60% by weight of (meth) acrylic esters of unbranched or branched alcohols having 1 to 15 C atoms, more particularly n-butyl acrylate or 2-ethylhexyl acrylate; and copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms, more particularly n-butyl acrylate or 2-ethylhexyl acrylate, which also contain 1% to 40% by weight of ethylene; copolymers with one or more vinyl esters, 1% to 50% by weight of ethylene and 1% to 60% by weight of vinyl chloride; where the polymers may further contain the aforementioned auxiliary monomers in the aforementioned amounts, and the amounts in % by weight add up in each case to 100% by weight.

Particular preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group consisting of methyl acrylate, ethyl acrylate, propyl acrylate, n-butyl acrylate, and 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate, and, optionally, ethylene; styrene-1,3-butadiene copolymers; where the polymers may further contain auxiliary monomers in the aforementioned amounts, and the amounts in % by weight add up in each case to 100% by weight.

Examples of particularly preferred comonomers for vinyl chloride copolymers are α-olefins, such as ethylene or propylene, and/or vinyl esters, such as vinyl acetate, and/or acrylic esters and/or methacrylic esters of alcohols having 1 to 15 C atoms, such as methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate, 2-ethylhexyl acrylate and/or fumaric and/or maleic monoesters or diesters such as the dimethyl, methyl tert-butyl, di-n-butyl, di-tert-butyl, and diethyl esters of maleic acid and fumaric acid.

Most preferred are copolymers with vinyl acetate and 5% to 50% by weight of ethylene; or copolymers with vinyl acetate, 1% to 50% by weight of ethylene, and 1% to 50% by weight of a vinyl ester of α-branched monocarboxylic acids having 9 to 11 C atoms; or copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms, which also contain 1% to 40% by weight of ethylene; or copolymers with vinyl acetate, 5% to 50% by weight of ethylene and 1% to 60% by weight of vinyl chloride.

The most preferred copolymers are also vinyl chloride-ethylene copolymers containing 60% to 98% by weight of vinyl chloride units and 1% to 40% by weight of ethylene units, the amounts in % by weight being based on the total weight of the copolymer and adding up in each case to 100% by weight. Vinyl chloride-ethylene copolymers of this kind are known from EP 0 149 098 A2.

The coating compositions preferably comprise at least two polymers and more preferably one or more vinyl ester polymers and one or more further polymers. As polymers here, the same homopolymers or copolymers of vinyl esters and the same homopolymers or copolymers of (meth)acrylic esters, vinylaromatics, olefins, 1,3-dienes or vinyl halides are preferred, more preferred and most preferred that are set out accordingly earlier on above.

The monomer selection and the selection of the weight fractions of the comonomers are made in such a way as to result in a glass transition temperature, Tg, of −50° C. to +30° C., preferably −40° C. to +10° C., more preferably −30° C. to 0° C. The glass transition temperature Tg of the polymers can be determined in a known way by means of differential scanning calorimetry (DSC). The Tg may also be calculated approximately in advance by means of the Fox equation. According to Fox T. G., Bull. Am. Physics Soc. 1, 3, page 123 (1956), the following holds: $1/Tg = x1/Tg1 + x2/Tg2 + \ldots + xn/Tgn$, where xn is the mass fraction (% by weight/100) of the monomer n, and Tgn is the glass transition temperature, in kelvins, of the homopolymer of the monomer n. Tg values for homopolymers are listed in the Polymer Handbook 2nd edition, J. Wiley & Sons, New York (1975).

The polymers are prepared generally in an aqueous medium and preferably by the emulsion or suspension polymerization process—as described in DE-A 102008043988, for example. The polymers in this case are obtained in the form of aqueous dispersions. During the polymerization it is possible to use the commonplace protective colloids and/or emulsifiers, as described in DE-A 102008043988. The protective colloids may be anionic, or preferably cationic or nonionic. Also preferred are combinations of cationic and nonionic protective colloids. Preferred nonionic protective colloids are polyvinyl alcohols. Preferred cationic protective colloids are polymers which carry one or more cationic charges, as described in, for example, E. W. Flick, Water Soluble Resins—an Industrial Guide, Noyes Publications, Park Ridge, N.J., 1991. Preferred protective colloids are partially hydrolyzed or fully hydrolyzed polyvinyl alcohols having a degree of hydrolysis of 80 to 100 mol %, more particularly partially hydrolyzed polyvinyl alcohols having a degree of hydrolysis of 80 to 94 mol % and a Höppler viscosity, in 4% strength aqueous solution, of 1 to 30 mPas (Höppler method at 20° C., DIN 53015). The stated protective colloids are obtainable by means of methods known to the skilled person, and are added generally in an amount totaling 1% to 20% by weight, based on the total weight of the monomers, in the polymerization.

The polymers in the form of aqueous dispersions can be converted, as described in DE-A 102008043988, into corresponding water-redispersible powders. In this case, in general, a drying aid is used, in a total amount of 3% to 30% by weight, preferably 5% to 20% by weight, based on the polymeric constituents of the dispersion. Preferred drying aids are the aforementioned polyvinyl alcohols.

The invention further provides polymer mixtures in the form of aqueous dispersions or water-redispersible powders comprising one or more vinyl ester polymers and one or more (meth)acrylic ester polymers, wherein the vinyl ester polymers are based on one or more vinyl esters of carboxylic acids having 5 to 13 C atoms, one or more further vinyl esters, and, if desired, one or more monomers copolymerizable therewith.

Preferred vinyl esters of carboxylic acids having 5 to 13 C atoms are vinyl 2-ethylhexanoate, vinyl pivalate, and, in particular, vinyl laurate or vinyl esters of α-branched monocarboxylic acids having 9 to 11 C atoms, an example being VeoVa9$^R$ or VeoVa10$^R$ (trade names of the company Resolution). Preferred further vinyl esters are vinyl propionate, 1-methylvinyl acetate, vinyl butyrate, and, in particular, vinyl acetate. Preferred copolymerizable monomers are (meth)acrylic esters, vinylaromatics, 1,3-dienes, vinyl halides, auxiliary monomers, and, in particular, olefins, such as ethylene.

The polymer mixtures preferably comprise vinyl ester polymers based to an extent of 5% to 50% by weight and more particularly 10% to 40% by weight on one or more vinyl esters of carboxylic acids having 5 to 13 C atoms. Further vinyl esters, more particularly vinyl acetate, are present preferably at 5% to 95% by weight, more preferably at 20% to 80% by weight, and most preferably at 30% to 70% by weight. Copolymerizable monomers, especially ethylene, are present preferably at 5% to 50% by weight and more preferably at 10% to 40% by weight. The amounts in % by weight are based in each case on the total weight of the vinyl ester polymer in question.

The (meth)acrylic ester polymers of the polymer mixtures are based preferably on methyl (meth)acrylate and one or more methacrylic esters of alcohols having preferably 2 to 15 C atoms, more preferably 2 to 10 C atoms, and most preferably 2 to 8 C atoms, and also, if desired, further monomers copolymerizable therewith.

The polymer mixtures comprise preferably (meth)acrylic ester polymers based to an extent of 10% to 90% by weight and more particularly 20% to 80% by weight on (meth)acrylic acid methyl esters. Methacrylic esters of alcohols having preferably 2 to 15 C atoms are preferably present at 10% to 90% by weight and more preferably at 20% to 80% by weight. The amounts in % by weight are based in each case on the total weight of the (meth)acrylic ester polymer in question.

The weight ratio of the vinyl ester polymers and of the (meth)acrylic ester polymers may be arbitrary and is for example 99:1 to 1:99 and preferably 3:1 to 1:3.

For preparing the polymer mixtures, the vinyl ester polymers and the (meth)acrylic ester polymers may be mixed, for example, each in the form of water-redispersible powders or aqueous dispersions, and may subsequently, if desired, be dried. Dispersions are also obtainable by redispersing the water-redispersible powders in water. Mixing, redispersing or drying is not tied to any particular procedure and may take place in the apparatus customary for such operations.

Examples of suitable mineral binders are cement, more particularly portland cement, aluminate cement, especially calcium sulfoaluminate cement, trass cement, slag cement, magnesia cement, phosphate cement, or blast furnace cement, and also mixed cements, filler cements, fly ash, microsilica, slag, lime hydrate, white lime hydrate, calcium oxide (unslaked lime), and gypsum. Preference is given to portland cement, aluminate cement, and slag cement, and also to mixed cements, filler cements, lime hydrate, white lime hydrate or gypsum. As portland cement, white cement is preferred. White cement may also be used in combination with one or more of the other mineral binders referred to above. White cement enhances the light stability of the roof coatings.

Examples of suitable fillers are quartz sand, finely ground quartz, finely ground limestone, calcium carbonate, dolomite, clay, chalk, white lime hydrate, talc or mica, granulated rubber or hard fillers, such as aluminum silicates, corundum, basalt, carbides, such as silicon carbide or titanium carbide, or fillers which give a pozzolanic reaction, such as fly ash, metakaolin, microsilica or diatomaceous earth. Preferred fillers are quartz sand, finely ground quartz, finely ground limestone, calcium carbonate, calcium magnesium carbonate (dolomite), chalk or white lime hydrate. The fillers preferably do not include gravel. Gravel has diameters, generally, of ≥2 mm.

Also preferred is the use of lightweight fillers. Lightweight fillers are those fillers having a low bulk density, usually of less than 500 g/l. Typical lightweight fillers, on a synthetic or natural basis, are substances such as hollow glass microbeads, polymers such as polystyrene beads, aluminosilicates, silicon oxide, aluminum silicon oxide, calcium silicate hydrate, silicon dioxide, aluminum silicate, magnesium silicate, aluminum silicate hydrate, calcium aluminum silicate, calcium silicate hydrate, aluminum iron magnesium silicate, calcium metasilicate and/or volcanic slags. The form of the lightweight fillers is not limited and they may in particular have a spherical, platelet-like, rod-shaped and/or lamellar structure. Preferred lightweight fillers are pearlites, Celite, Cabosil, Circosil, Eurocell, Fillite, Promaxon, Vermex and/or wollastonites, and also polystyrene.

It is also possible to use any desired mixtures of the stated fillers. Preferred mixtures comprise one or more silicatic fillers selected from the group consisting of sand, and one or more carbonatic fillers selected from the group consisting of calcium carbonate, chalk, dolomite, and limestone. Preferred mixtures comprise one or more silicatic fillers and one or more carbonatic fillers in a ratio of 1:1 to 4:1. With particular preference the only fillers present are silicatic fillers.

The fillers preferably have average particle diameters of 0.01 to 5 mm, more preferably 0.05 to 3 mm and most preferably 0.1 to 2 mm (as may be determined by means of laser diffraction analysis).

Preferably at least 15% by weight of the fillers have a diameter of 0.063 to 0.5 mm, based on the dry weight of the fillers used in total; more preferably at least 10% by weight of the fillers have a diameter of 0.063 to 0.25 mm, based on the dry weight of the fillers used in total; most preferably at least 5% by weight of the fillers have a diameter of 0.063 to 0.125 mm; in each case based on the dry weight of the fillers used in total. As a consequence of the inventive particle diameters of the fillers, the coatings that are obtainable in accordance with the invention undergo relatively low contraction in the course of their production, and this counteracts cracking within the coatings of the invention and is beneficial for crack bridging.

Typical formulas for the coating compositions comprise preferably 10% to 60%, more preferably 20% to 55%, and most preferably 25% to 50% by weight of polymers; preferably 2% to 40% by weight and most preferably 10% to 30% by weight of mineral binders; preferably 5% to 80%, more preferably 10% to 60%, and most preferably 20% to 40% by weight of fillers; where the amounts in % are based on the dry weight of the coating compositions and add up in total to 100% by weight.

The coating compositions comprise preferably 50% to 95%, more preferably 55% to 90%, and most preferably 60% to 85% by weight of polymers, based on the dry weight of the polymers and of the mineral binders.

The coating compositions are preferably dry mixes.

Generally speaking, water is added to the coating compositions before they are applied. The aqueous coating compositions obtained in this way comprise preferably 15% to 50%, more preferably 20% to 45%, and most preferably 25% to 35% by weight of water, based on the dry weight of the coating compositions.

The performance properties of the coating compositions may be enhanced through additives or adjuvants. Examples of suitable additives include pigments, especially inorganic pigments, such as oxide, oxide hydroxide, sulfate, sulfide, sulfoselenide, carbonate, chromate, chromate-molybdate mixed-phase, or silicate pigments. Preferred pigments in this context are titanium-, iron-, chromium-, cadmium- or sulfate-containing pigments. The most preferred pigments are titanium dioxide, barium sulfate or zinc oxide. Pigments are present in the coating compositions preferably at 0% to 15%, more preferably at 0.1% to 10%, and most preferably at 0.1% to 7%, by weight, based on the dry weight of the coating compositions in question. The pigments are added for the purpose of coloring the roof coatings. In this way it is possible to remove the need for a possible additional step for applying paint to the roof coatings. Pigments fulfill esthetic purposes, but also affect the internal climate, since, for example, white roof coatings, such as roof coatings comprising titanium dioxide pigments, heat up to less of an extent thermally under insolation.

Another preferred additive are highly disperse silicas, also known by the abbreviation HDK. Highly disperse silicas are present in the coating compositions preferably at 0.1% to 3% and more preferably at 0.3% to 1% by weight, based on the dry weight of the respective coating compositions. Using highly disperse silicas results in roof coatings which are more impervious to the penetration of water. Furthermore, their use is also advantageous with regard to the production of the roof coatings, since aqueous coating compositions of this kind are less sticky and dry more rapidly in the course of the setting of the mineral binders.

Another preferred additive are phyllosilicates, more particularly micas. Phyllosilicates are present preferably at 0% to 3% and more preferably at 0.1% to 2% by weight, based on the dry weight of the coating compositions. With phyllosilicates it is possible to increase the watertightness or light stability of the roof coatings.

Other preferred additives are fibers. Examples of suitable fibers are Kevlar, viscose fibers, polyamide fibers, polyester fibers, polyacrylonitrile fibers, Dralon fibers, polyethylene fibers, polypropylene fibers, polyvinyl alcohol fibers, aramid fibers or carbon fibers. Fibers are present preferably at 0% to 1% and more preferably at 0% to 0.5% by weight, based on the dry weight of the coating compositions. Using fibers results in roof coatings having more strongly crack-bridging properties.

Typical adjuvants for coating compositions are thickeners, examples being polysaccharides such as cellulose ethers and modified cellulose ethers, starch ethers, guar gum, xanthan gum, polycarboxylic acids such as polyacrylic acid and the partial esters thereof, and also polyvinyl alcohols, which where appropriate may be acetalized or hydrophobically modified, casein, and associative thickeners. Other typical adjuvants are retardants, such as hydroxycarboxylic acids, or dicarboxylic acids or the salts thereof, saccharides, oxalic acid, succinic acid, tartaric acid, gluconic acid, citric acid, sucrose, glucose, fructose, sorbitol, and pentaerythritol. Further common adjuvants are crosslinkers such as metal oxides or semimetal oxides, especially boric acid or polyborates, or dialdehydes, such as glutaraldehyde; other typical adjuvants are setting accelerators, examples being alkali metal salts or alkaline earth metal salts of organic or inorganic acids. Furthermore, the following may be mentioned: preservatives, film-forming assistants, dispersants, foam stabilizers, defoamers, plasticizers, flow agents, and flame retardants (e.g., aluminum hydroxide).

Generally speaking, the proportion of adjuvants in the coating compositions totals 0% to 20%, preferably 0.1% to 15%, and more preferably 0.1% to 10%, by weight, based in each case on the dry weight of the coating compositions.

The preparation of the coating compositions on the basis of mineral binders, polymers, fillers, and, if desired, additives, is not tied to any particular procedure or mixing apparatus. Coating compositions are obtainable by mixing and homogenizing the individual ingredients of the formula in conventional powder mixing apparatus, as for example by means of mortar mixers, concrete mixers or plaster machines or stirrers. In the mixing operation, the individual ingredients are used generally in dry form.

The polymers may be used in the form of aqueous dispersions or, preferably, in the form of water-redispersible powders.

The coating compositions may be provided in, for example, the form of one-component systems or two-component systems. One-component systems comprise all of the ingredients of the coating compositions. With one-component systems, the formulations are generally dry formulations. One-component systems are prepared preferably by premixing polymers, additives if desired, and adjuvants if desired, and admixing mineral binders and also fillers at a later point in time. To prepare the aqueous coating compositions, the water may be admixed at any later point in time, generally shortly prior to application of the coating compositions.

Two-component systems comprise a first component and a second component. The first component comprises all of the ingredients of the coating compositions apart from polymers. The first component is generally a dry formulation. The second component comprises the polymers, preferably in the form of aqueous dispersions. For preparing the coating compositions, which may be aqueous, the first component and the second component are mixed, where appropriate with addition of water.

The invention further provides methods for producing roof coatings, wherein aqueous coating compositions based on one or more mineral binders, one or more polymers, one or more fillers, and, if desired, one or more additives are applied to a substrate, where
the coating compositions comprise at least 50% by weight of polymers, based on the dry weight of the polymers and of the mineral binders.

The invention further provides roof coatings obtainable by the method of the invention.

The roof coatings have coat thicknesses of preferably 0.1 mm to 30 mm, more preferably 0.5 mm to 10 mm, and most preferably 1 mm to 4 mm.

The aqueous coating compositions may be applied by manual methods or mechanical methods. In the case of manual methods, the aqueous coating compositions are applied using coarse brushes, fine brushes, rollers, knives, trowels, paddles or shovels to the substrate. In the case of mechanical methods, the aqueous coating compositions are applied by means of spray machines, plastering machines or robots to the substrate. Two or more coats of coating compositions may be applied one above another. It is preferred to apply only one coat of the coating compositions to a substrate. Following the application of coating compositions to the substrate, the surface of the applied coat may be smoothed, using smoothing disks or paddle smoothers.

For the purpose of strengthening, it is also possible to incorporate woven fabrics, mats, nonwovens, membranes or reinforcement into the roof coatings. The roof coatings of the invention, however, preferably contain no woven fabrics, mats, nonwovens, membranes, cladding or reinforcements.

The coating compositions are applied typically at ambient temperatures, i.e., in general, at temperatures from 0 to 50° C., more particularly from 5 to 35° C.

The substrates may be organic or inorganic and natural or synthetic in nature. Typically the substrates are common substrates from the construction segment, such as substrates based on compositions comprising mineral binders, more particularly concrete, such as lightweight concrete, for example, or screeding. Alternative substrates may be timber, such as plywood or compressed wood boards, or plastics, such as plastic sheets, plastic foam boards or rubber mats, especially polyurethane panels or Styropor foam boards, or metals, more particularly aluminum, asphalt, or bituminous films or felts.

The substrates may be primed before the coating compositions are applied. Examples of suitable priming compositions include aqueous dispersions of the aforementioned polymers, preferably with solids contents of 20 to 50, or else plastic films, plastic foam boards or rubber mats. Finally, further coats may be applied to the roof coatings of the invention, such as tiles, leveling compounds, renders or, in particular, paint coats, for example.

On substrates based on wood, such as plywood, it is preferred first to apply plastic films, plastic foam boards or rubber mats, and to apply the coating composition used in accordance with the invention over this system. In the case of substrates based on compositions comprising mineral binders, such as concrete or screeding, it is preferred first to apply an aqueous dispersion of the aforementioned polymers, and to apply the coating composition used in accordance with the invention over this system. The roof coatings of the invention preferably form the uppermost or concluding coat on the substrates.

The roof coatings are suitable for all kinds of constructions, such as, for example, for buildings, especially houses, factories or public buildings. The roofs and substrates in these cases may be inclined or flat, planar or curved. Preferably the inclination of the substrates is low, and so water applied to them runs straight off and does not remain standing for some time. With particular preference the substrates have an inclination of 0% to 20%, more preferably of 2% to 5%.

The roof coatings of the invention exhibit very good adhesion to a wide variety of different substrates. The roof coatings produced in accordance with the invention are notable, surprisingly, for advantageous performance properties, and have, for example, outstanding mechanical properties, water-tightness, and temperature stability. On account of their flexibility, the roof coatings possess advantageous crack-bridging properties, and so cracks developing in substrates are sealed and the substrates are protected from ambient water. In spite of their watertightness, the roof coatings of the invention are permeable to water vapor. Lastly, because of the constitution of the coating compositions of the invention, and because of the selection of polymers, the soiling propensity of the roof coatings is low. This can also be attributed to the surface properties of the roof coatings of the invention. And, through use of coating compositions comprising at least two polymers, especially the polymer mixtures of the invention, it is possible to achieve further improvement in the water resistance and the freeze-thaw resistance, and, moreover, in the light stability—in other words, all in all, in the durability of the roof coatings. Furthermore, the roof coatings originating from the coating compositions are obtainable through a few, simple operations, using common building site equipment, in a time-efficient way. This is so not least because the coating compositions of the invention exhibit rapid through-drying.

The examples which follow serve for detailed elucidation of the invention, and should in no way be interpreted as constituting any restriction.

EXAMPLE 1 (Ex. 1)

For preparing the coating composition, the ingredients of the dry formula indicated below were placed in a Toni mixer (commercial laboratory mixer) and mixed homogeneously at level 1 for 15 minutes. The aqueous coating composition was prepared from the resultant dry mix in analogy to EN 196-1, using 32% by weight of water, based on the total weight of the dry formula.
Dry Formula:
10% by weight portland cement,
30% by weight quartz sand (diameter: 0.063 mm to 0.3 mm),
13.4% by weight calcium carbonate,
0.5% by weight highly disperse silica (Wacker HDK H 15),
0.5% by weight defoamer (silicone defoamer),
1.5% by weight bentonite,
44.1% by weight VINNAPAS LL 4040 N (vinyl acetate-ethylene copolymer, stabilized with polyvinyl alcohol and a cationic protective colloid).

The aqueous coating composition was applied to Teflon formwork components (base area: 30×15 cm) in a wet film thickness of 2 mm. The wet films were smoothed using a trowel. After storage for 24 hours under standard conditions in accordance with DIN50014, the films had cured and, following removal of the Teflon formwork components, were subjected to the following storage conditions:
one film was stored for 28 days under standard conditions (23° C./50% relative humidity) (dry storage);
another, identical film, following the aforementioned dry storage, was stored for a further 38 days in mains water at 23° C. and thereafter for 28 days under standard conditions (23° C./50% relative humidity) (wet storage).

EXAMPLE 2 (Ex. 2)

Analogous to example 1, with the difference that the following dry formula and the amount of water below were used for preparing the coating composition:
Dry Formula:
20% by weight portland cement,
35.9% by weight quartz sand,
2% by weight titanium dioxide,
0.6% by weight accelerant (calcium formate),
1.5% by weight bentonite,
40% by weight VINNAPAS 7055 N (vinyl acetate-ethylene-vinyl ester terpolymer, stabilized with polyvinyl alcohol).
30% by weight of water was used, based on the total weight of the dry formula.

EXAMPLE 3 (Ex. 3)

Analogous to example 1, with the difference that the following dry formula and the amount of water below were used for preparing the coating composition:
Dry Formula:
13% by weight portland cement,
5% by weight aluminate cement,
32% by weight quartz sand,
5% by weight lightweight filler,
13.4% by weight carbonate,
0.1% by weight retardant (sodium tartrate),
0.5% by weight highly disperse silica (Wacker HDK H 15),
0.3% by weight polyacrylonitrile fibers,
0.7% by weight thickener (acrylate thickener),
30% by weight VINNAPAS 5044 N (vinyl acetate-ethylene copolymer, stabilized with polyvinyl alcohol).
35% by weight of water was used, based on the total weight of the dry formula

COMPARATIVE EXAMPLE 4 (CEx. 4)

Analogous to example 1, with the difference that the following dry formula and the amount of water below were used for preparing the coating composition:
Dry Formula:
36% by weight portland cement,
27% by weight quartz sand,
20.9% by weight calcium carbonate,
0.1% by weight cellulose ether,
1% by weight defoamer (silicone defoamer),
4% by weight bentonite,
11.0% by weight VINNAPAS LL 4040N.
40% by weight of water was used, based on the total weight of the dry formula.

Testing of the Tensile Strength and Elongation at Break of the Coatings

In accordance with ISO 527-3 (August 1995), a type 1 B standard rod was punched from each of the films of the respective example or comparative example, obtained after dry and wet storage, respectively.

Subsequently the tensile strength and elongation at break of the standard rods were determined by means of a tensile test in accordance with ISO 527-3 (August 1995). The standard rods were stretched to failure at a tensioning speed of 50 mm/min. The results of the testing are set out in Table 1.

TABLE

| | Testing of the coatings: | | | |
|---|---|---|---|---|
| | Tensile strength [N/mm²] | | Elongation at break [%] | |
| | Dry storage | Wet storage | Dry storage | Wet storage |
| Ex. 1 | 1.9 | 2.3 | 49 | 40 |
| Ex. 2 | 1.6 | 2.05 | 103 | 70 |
| Ex. 3 | 1.8 | 2.4 | 55 | 29 |
| CEx. 4 | 1.6 | n.d.* | 5 | n.d.* |

*n.d. = not determined.

Examples 1 to 3 show high tensile strengths combined with high elongations at break, i.e., high crack-bridging properties and flexibility, respectively. Comparative Example 4 is notable, on the other hand, for a virtual absence of elongation at break, and it possesses virtually no flexibility after water storage.

Testing of the Water Impermeability of the Coatings

The water impermeability was tested in accordance with DIN EN 14891 using the test specimens after dry storage. The coatings of Examples 1 to 3 passed the requirements of the standard and showed no penetration of water. Comparative Example 4 did not pass the DIN EN 14891 water impermeability test.

The coatings of the invention, accordingly, are very suitable as roof coatings, and achieve the objects according to the invention.

What is claimed is:

1. A method for producing roof coatings, which comprises applying an aqueous coating composition consisting of water, one or more cements, one or more polymers, one or more fillers, and optionally one or more additives to a substrate;
   wherein the polymers are derived from one or more ethylenically unsaturated monomers selected from the group consisting of vinyl esters, (meth)acrylic esters, vinylaromatics, olefins, 1,3-dienes, and vinyl halides, and optionally further monomers copolymerizable therewith, and the one or more polymers are present in the form of a water-redispersible powder or a protective colloid-containing aqueous dispersion;
   the coating composition comprising from 55 to 90% by weight of the polymers, based on the dry weight of the polymers and of the cements;
   wherein the one or more cements constitute 10% to 30% by weight of the dry weight of the coating composition;
   wherein the roof coatings contain no reinforcing fabric, no mats, and no cladding;
   wherein the one or more fillers are selected from the group consisting of quartz sand, finely ground quartz, finely ground limestone, calcium carbonate, dolomite, chalk, white lime hydrate, talc, granulated rubber, aluminum silicates, corundum, basalt, carbides, materials that give a pozzolanic reaction, hollow glass microbeads, polystyrene beads, aluminosilicates, silicon oxide, aluminum silicon oxide, calcium silicate hydrate, silicon dioxide, aluminum silicate, magnesium silicate, aluminum silicate hydrate, calcium aluminum silicate, calcium silicate hydrate, aluminum iron magnesium silicate, calcium metasilicate, volcanic slags and wollastonites;
   wherein the one or more additives are selected from the group consisting of pigments, phyllosilicates, highly disperse silicas and fibers; and
   wherein the substrate is the outer surface of a roof of a building.

2. Roof coatings obtained by the method of claim 1.

3. The method according to claim 1, wherein the roof coatings have coat thicknesses of 0.1 mm to 30 mm.

4. The method according to claim 1, wherein the substrate to which the coating composition is applied has an inclination of 0 to 20%.

5. The method according to claim 1, wherein the one or more polymers are selected from the group consisting of
   copolymers containing one or more vinyl esters and 1% to 50% by weight of ethylene;
   copolymers containing vinyl acetate, 1% to 50% by weight of ethylene, and 1% to 50% by weight of one or more further comonomers selected from the group consisting of vinyl esters having 1 to 12 C atoms in the carboxylic acid radical;
   copolymers containing one or more vinyl esters, 1% to 50% by weight of ethylene, and 1% to 60% by weight of (meth)acrylic esters of unbranched or branched alcohols having 1 to 15 C atoms;
   copolymers containing 30% to 75% by weight of vinyl acetate, 1% to 30% by weight of vinyl laurate or vinyl esters of an alpha-branched carboxylic acid having 9 to 11 C atoms, 1% to 30% by weight of (meth)acrylic esters of unbranched or branched alcohols having 1 to 15 C atoms, and 1% to 40% by weight of ethylene; and
   copolymers containing one or more vinyl esters, 1% to 50% by weight of ethylene, and 1% to 60% by weight of vinyl chloride.

6. The method according to claim 1, wherein the one or more polymers comprise copolymers of vinyl acetate, ethylene and one or more monomers selected from the group consisting of vinyl 2-ethylhexanoate, vinyl pivalate, vinyl laurate, and vinyl esters of α-branched monocarboxylic acids having 9 to 13 C atoms.

7. The method according to claim 1, wherein the one or more fillers constitute 5 wt. % to 80 wt. % of the dry weight of the coating composition.

8. A method for producing roof coatings, which comprises applying an aqueous coating composition based on one or more cements, two or more polymers, one or more fillers, and optionally one or more additives to a substrate, the coating composition comprising at least 50% by weight of the polymers, based on the dry weight of the polymers and of the cements, wherein said polymers are in the form of an aqueous dispersion or a water-redispersible powder comprising one or more vinyl ester polymers and one or more (meth)acrylic ester polymers, wherein the vinyl ester polymers are based on one or more vinyl esters of carboxylic acids having 5 to 13 C atoms, one or more further vinyl esters, and optionally one or more monomers copolymerizable therewith selected from the group consisting of vinylaromatics, 1,3-dienes, vinyl halides and olefins;
   wherein the roof coatings contain no reinforcing fabric, no mats, and no cladding;
   wherein the one or more fillers are selected from the group consisting of quartz sand, finely ground quartz, finely ground limestone, calcium carbonate, dolomite, chalk, white lime hydrate, talc, granulated rubber, aluminum silicates, corundum, basalt, carbides, materials that give a pozzolanic reaction, hollow glass microbeads, polystyrene beads, aluminosilicates, silicon oxide, aluminum silicon oxide, calcium silicate hydrate, silicon dioxide, aluminum silicate, magnesium silicate, aluminum silicate hydrate, calcium aluminum silicate, calcium silicate hydrate, aluminum iron magnesium silicate, calcium metasilicate, volcanic slags and wollastonites; and
   wherein the one or more additives are selected from the group consisting of pigments, phyllosilicates, highly disperse silicas and fibers.

9. The method according to claim 8, wherein the one or more fillers constitute 5 wt. % to 80 wt. % of the dry weight of the coating composition.

* * * * *